Dec. 23, 1958  N. DORBECKER ET AL  2,865,371
APPARATUS FOR RAPIDLY INJECTING RADIO-OPAQUE
LIQUID UNDER PRESSURE IN THE TECHNIQUE
OF SELECTIVE ANGIOCARDIOGRAPHY
Filed Oct. 18, 1954  3 Sheets-Sheet 3
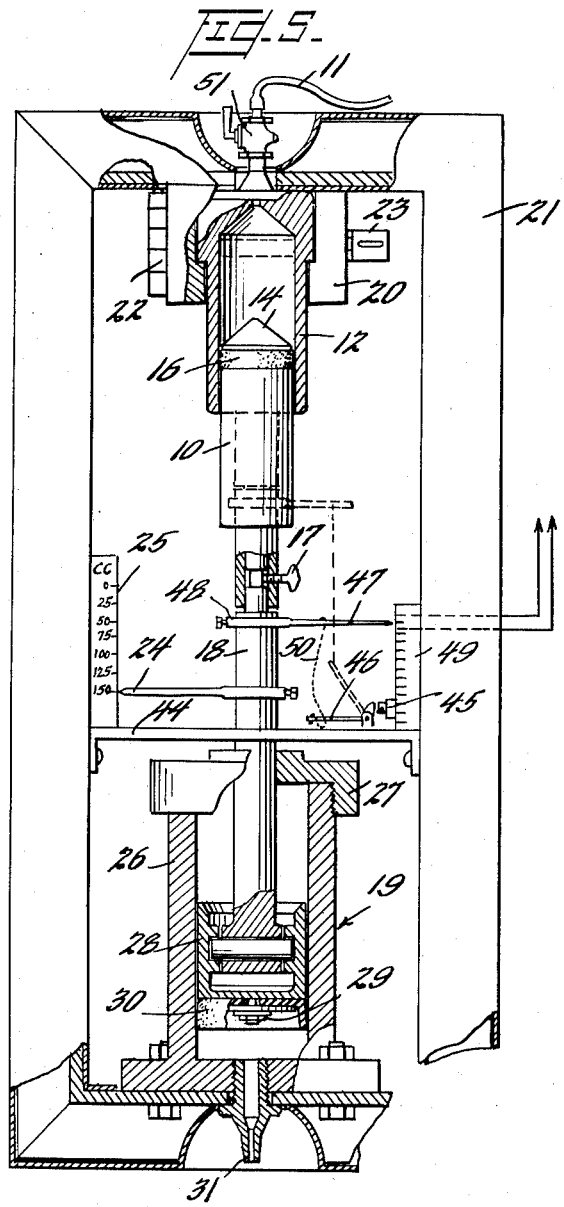
INVENTORS
NARNO DORBECKER
ANTONIO RODRIQUEZ-ALVAREZ
BY Watson, Cole, Grindle & Watson
ATTORNEYS

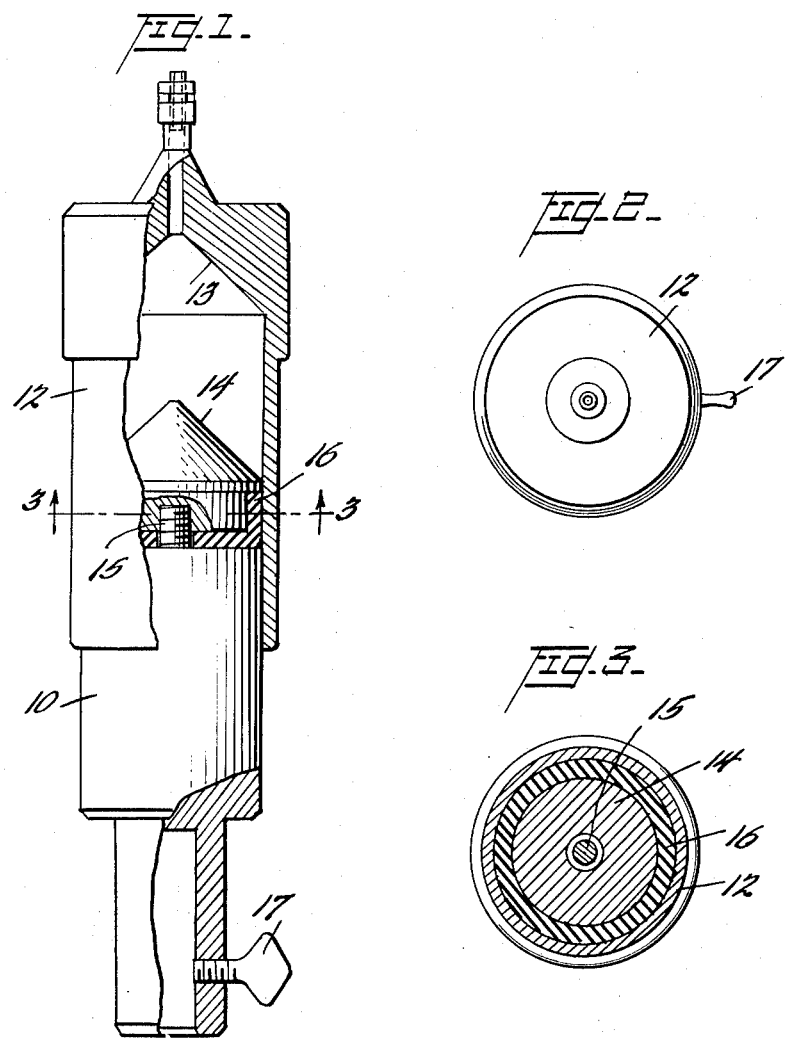

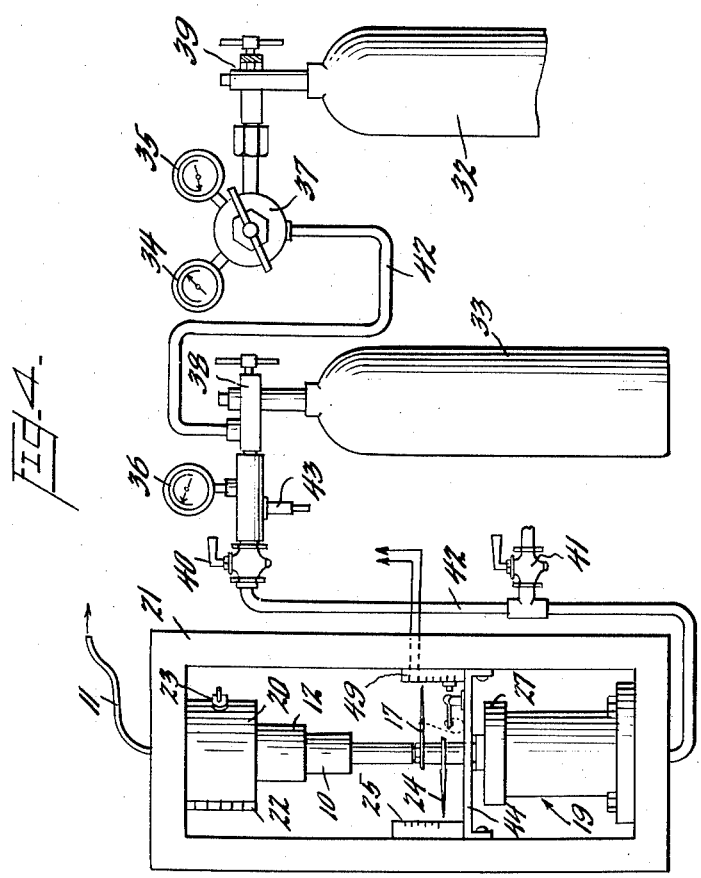

2,865,371

APPARATUS FOR RAPIDLY INJECTING RADIO-OPAQUE LIQUID UNDER PRESSURE IN THE TECHNIQUE OF SELECTIVE ANGIOCARDIOGRAPHY

Narno Dorbecker and Antonio Rodriguez-Alvarez, Mexico City, Mexico

Application October 18, 1954, Serial No. 462,742

8 Claims. (Cl. 128—214)

In the technique of selective angiocardiography and aortography a long, narrow-bore cardiac catheter (Courhand type), is introduced into the cardiac chambers and great blood vessels through an antecubital vein or artery. By this means there is injected with a glass syringe (such as used for hypodermic injections) a viscous liquid substance which is a compound derived from iodine and is opaque to X-rays. After making the injection, radiographs are taken for the purpose of making the cardiac cavities or blood vessels visible.

To obtain a good radiological contrast, it is necessary that the radio-opaque substance reach a certain degree of concentration in the blood, which it is very difficult to obtain using the aforesaid glass syringe and human muscular force.

To solve this problem, various authors have devised other methods of injecting, employing different devices.

In 1931 Dos Santos introduced the use of compressed air for injecting the radio-opaque substance. In his apparatus, the compressed air was in direct contact with the substance to be injected and accordingly there was present the serious danger that once the liquid was exhausted, the air under pressure might be introduced very rapidly into the patient's circulatory system, which might cause a disaster.

The use of metal syringes, employed subsequently, has presented a new difficulty: since they are not transparent, it is difficult to make sure that the air has been completely expelled from their interior. Some authors (Jonsson, in Sweden) have devised devices which prevent the plunger of the syringe from traveling the full distance, thus leaving unemptied a portion of the contents of the syringe in which the air would remain theoretically. Durand, in France, has described a syringe having features similar to that above-described but which also has, at the bottom thereof, a rubber plug which the plunger presses against at the end of its stroke, thus preventing the injection of air. The aforesaid authors use the syringe vertically, placing the end through which the liquid issues downwards, whereby the air occupies the upper portions and the danger of introducing it appears only at the end of the injection. To move the plungers of the syringes, human force has been used, augmented by the employment of a lever in some cases, an electric motor in others, etc.

Erik Lindgren, in Sweden (1953), has designed an apparatus which employs compressed air at 8 atmospheres' pressure, which is transmitted to a metallic piston which in turn drives the plunger of a glass syringe. This apparatus has the advantages of using compressed air and of having a syringe with transparent walls (glass syringe). It has the following disadvantages: Although the pressure of 8 atmospheres is apparently very great, such pressure is transmitted to a metallic piston the diameter of which is equal to that of the glass syringe, wherefor the pressure in the latter cannot be sufficiently high or as high as desired.

The apparatus contemplated by the present invention overcomes the disadvantages of metallic syringes, which permits using great pressures, since a maximum pressure of 7 kg. per cm.$^2$ (100 pound per square inch) is transmitted to a metallic piston which has a surface four times larger in cross section than that of the plunger of the metallic syringe which it drives, thereby quadrupling the initial pressure.

Another objective achieved is the complete isolation of the compartment in which the compressed air is present, from that which contains the liquid to be injected, and the most important feature of the apparatus herein described is a mechanism by means of which the air contained in the syringe can be expelled completely before making the injection. There have been added to the system two small tanks of compressed air, one of which, at a pressure of 106 kg. per cm.$^2$ (1500 pounds per square inch) serves as a source of energy and is sufficient for using the apparatus on various occasions with the same charge of air.

The apparatus also utilizes a microswitch with a 10-ampere current, which makes it possible to select, before applying the injection, the most opportune moment for starting the operation of the seriograph and the X-ray apparatus. All this is mounted in a steel cabinet with rubber wheels for the easy transportation of the apparatus.

Figure 1 shows the metallic syringe in conventional perspective, with some parts in section to show its internal elements.

Figure 2 shows a perspective of the same syringe, viewed from its upper end.

Figure 3 is a section of the metallic syringe at the level of line 3—3 of Fig. 1.

Figure 4 illustrates a view of the apparatus as a whole.

Figure 5 details the parts placed inside frame 20 of Fig. 4.

As has been noted, the apparatus of this invention is composed of the following principal parts:

(1) A stainless steel syringe having special characteristics, which contains the radio-opaque substance to be injected into the patient and into which the compressed air does not enter;

(2) A device for receiving the compressed air, the piston of which has a surface, in cross section, four times larger than the plunger of the aforesaid syringe;

(3) Two small steel tanks for storing compressed air, one of which is a high-pressure tank at 106 kg. per cm.$^2$ (up to 1500 pounds per square inch) and the other of which is at a low pressure of up to 7 kg. per cm.$^2$ (100 pounds per square inch);

(4) A set of gauges, regulator, cocks, valves, and connecting lines; and (5) A microswitch for 10-ampere electric current, for starting the operation of the seriograph and the X-ray apparatus, in the interval selected for the injection.

The syringe is made of stainless steel so that it may be sterilized easily in an autoclave or by means of non-corrosive antiseptic liquids. Its basic importance resides in the fact that it is placed vertically, with the end through which the liquid issues, at the upper part, which causes the air, by virtue of its lesser density, to occupy the highest portion and makes it possible to expel said air easily, before applying the injection, simply by moving the plunger 10. The exit of the air can easily be observed through the transparent walls of a polyvinyl tube 11 which connects the syringe with the needle or catheter introduced into the patient. This syringe consists of a hollow cylinder 12 with stainless steel walls, the bottom 13 of which is excavated in conical form to permit a perfect fit with the conical head 14 of the plunger 10 which moves slidingly in its interior. Integrally formed with said plunger 10 and also made of stainless steel is a screw-thread 15, on which said conical head 14 is screwed with a U-shaped packing 16 made of neutral rubber between the screw-thread 15 and the head 14, which packing hermetically seals the space between the cylinder and the plunger, such sealing being the more effective the greater the pressure be, to which the liquid contained in the cylinder is submitted. At the lower end of said plunger there is a set screw 17, for securing it to the stem of the shaft 18 from the device 19 which receives the compressed air. Finally, the cylinder of the syringe fits perfectly inside the mortise which is fixed on the upper part of the frame 21, and is opened by means of a hinge 21 and securely closed by means of latch 23 in Fig. 4. In addition the hand or pointer 24 (Fig. 5) indicates in cubic centimeters, on scale 25, the liquid contained in cylinder 12.

The device 19, which receives the compressed air to drive the plunger 10 of the aforesaid syringe, is located in the same frame 21 and immediately beneath the syringe, and is composed of the following elements: a metallic cylinder 26 with a plug or closure 27, the central orifice of which serves as a guide for shaft 18 which bears on its end the aluminum piston 28, the surface of which, in cross section, is four times larger than that of the plunger 10 of the syringe; said piston being secured to the shaft 18 by means of bolt 29. On the base of piston 28, just mentioned, there is a leather U-shaped packing 30 which prevents leakages of the compressed air which enters through orifice 31 and comes from tank 32 of Fig. 4.

Tanks 32 and 33, for storing compressed air (Fig. 4), gauges 34, 35 and 36, the pressure regulator 37, valves 38 and 39, cocks 40 and 41, and the respective connecting tubes 42, will be mentioned in detail upon explaining the operation of the apparatus as a whole, to avoid repetitions, although it is opportune to point out that pivot 43, in Fig. 4, serves for introducing air under pressure to the tanks, by means of a hand pump or compressor, thus obviating possible difficulties in localities in which compressed air service, of an industrial type, may not be available.

The microswitch for the current is likewise located on the frame 21 (Fig. 5), upon the plate 44 located on top of the compressed air device, 19, and is composed of the following elements: the switch proper, 45, for 10 amperes; the metal lever 46 which transmits the movements of shaft 18 to said switch 45 and which carries, on the end near the latter, an eccentric which presses the button of the switch when the other end of said lever is raised; pointer hand 47, secured to shaft 18 by means of the ring with the presser element 48 and the indications of which are read on the metallic rule 49 to know the moment at which the circuit of switch 45 is closed; and chain 50 which transmits the movements of the pointer hand 47, to said lever 46.

The apparatus as a whole operates in the manner which will now be described: Before proceeding to apply an injection, pressure regulator 37 is closed and valve 38 is opened to make sure, on high-pressure gauge 36 (up to 106 kg. per square centimeter, or 1500 pounds per square inch) that tank 33 contains compressed air at a pressure not below 35 kg. per cm.$^2$ (500 pounds per square inch). Then box or mortise 20 is opened and the sterile syringe is introduced and secured by means of screw 17 to shaft 18, after which the mortise is closed again and secured with latch 23. Next cock 51, Fig. 5, is screwed on tube 11, making sure that said cock and cocks 40 and 41, Fig. 4, are closed. Thereupon regulator 37 (Fig. 4) is opened to permit the passage of the compressed air until the low-pressure gauges 34 and 35 (up to 7 kg. per cm.$^2$ or 100 pounds per square inch) indicate a pressure of 0.7 kg. per cm.$^2$ (10 pounds per square inch). Then cock 40 is opened, making sure first that cock 41 is closed, whereby the plunger 10 of the syringe will rise expelling the air from cylinder 12 of Fig. 5. Immediately thereafter the distal end of the polyvinyl tube 11 (Fig. 4) is introduced into a sterile crystal cup graduated in cubic centimeters and containing the radio-opaque substance to be injected, taking care that the end of the tube reaches the bottom of the cup. Then cock 40 is closed and cock 41 is opened, whereby the radio-opaque substance, sometimes with air bubbles, will penetrate into the syringe, the passage thereof being observed through transparent tube 11. When the amount of fluid that is to be injected has entered into the syringe, 10 or 20 cm.$^3$ more should be added in order to be able to purge all air from the syringe, and thus, when plunger 10 (Fig. 5) rises, it will expel, through tube 11, air first and then liquid corresponding to the excess introduced, whereby there will remain in the syringe the exact amount to be injected, according to the reading furnished by pointer hand 24 on scale 25 (both shown in Fig. 5), at which moment cock 51 of Fig. 5 is closed. Under these conditions the wires from the microswitch connect together by virtue of a special socket joint with the circuit of the seriograph which in turn is connected with the X-ray apparatus. Tube 11 (Fig. 4) is suitably joined to the catheter which is introduced into the patient and regulator 37 is opened up to the optimum pressure at which the radio-opaque liquid should be injected. At this moment the pointer-hand 47 (Fig. 5) is placed in the desired position for the purpose of starting the operation of the seriograph and the X-ray apparatus either at the beginning, during the intermediate stages or at the end of the injection period. Under these circumstances, everything is ready for beginning the injection, for which purpose cock 51 (Fig. 5) is opened and the seriograph and the X-ray apparatus will begin to operate at the moment chosen. When the injection has been terminated, said cock 51 (Fig. 5) and cock 40 (Fig. 4) are closed; cock 41 is opened to expel the compressed air; tube 11 is disconnected from the patient and the aforesaid cock 51 (Fig. 5) is withdrawn by unscrewing it. Screw 17 is loosened (Fig. 4) whereby only shaft 18 will descend. Afterwards the syringe is held with the right hand while latch 23 is removed with the left hand and part 20 is opened, so that by lowering the right hand a few centimeters, the syringe can be taken out, ready to be washed with water and a detergent and then placed in an antiseptic solution. Then both valve 38 and regulator 37 are closed and the apparatus is ready for another injection.

Regulator 37 has a device which prevents the handle thereof from rotating beyond a limit of 7 kg. per cm.$^2$ (100 pounds per square inch), thus providing protection for the whole apparatus.

When, in the future, the technique for manufacturing catheters for these uses succeeds in producing them so that they will resist higher pressures, the apparatus can be adapted to permit greater pressures merely by suppressing the stop corresponding to 7 kg. per cm.$^2$ (100 pounds per square inch), which is provided on the aforesaid regulator.

Another way of increasing the pressure of the injection consists of utilizing a syringe having a plunger of a much smaller diameter but with the fundamental features above described.

Having thus described the invention, what we consider as new and desire to secure by Letters Patent is:

1. An apparatus of the class described comprising a hollow cylinder adapted to contain the substance to be injected and having an orifice in one end thereof, said cylinder being mounted so that its axis is substantially vertical and the end thereof containing said orifice being conically shaped, a plunger slidably mounted therein, said plunger having a conically shaped head at one end thereof adapted to fit into said conically shaped end of said cylinder, a piston attached to the other end of said plunger, the cross-sectional area of said piston being larger than the cross-sectional area of said plunger, a second hollow cylinder in which said piston is slidably mounted, an orifice in said second hollow cylinder, a source of compressed air connected to said last-named orifice, said last-named orifice being positioned in said second hollow cylinder so that compressed air from said source drives said piston and said plunger whereby the substance in said first hollow cylinder is expelled through said orifice therein.

2. An apparatus as claimed in claim 1 wherein said plunger comprises a conically shaped head adapted to fit into said conically shaped end of said hollow cylinder, a plunger body attached to said conically shaped head, a U-shaped packing disposed between said conically shaped head and said plunger body and a shaft detachably connecting said plunger body to said piston.

3. An apparatus as claimed in claim 1 wherein said source of compressed air comprises a first tank containing compressed air at a low pressure with a valve for opening and closing same, a regulator connected to the outlet side of said valve, a pressure gauge connected to said regulator, a second tank containing compressed air at a high pressure with a valve for opening and closing same, a first cock connected to the outlet side of said last-named valve, a duct, one end of which is connected to the outlet side of said regulator and the other end of which is connected between said last-named valve and said first cock, a pressure gauge connected between said last-named valve and said first cock, a second duct, one end of which is connected to the outlet side of said first cock and the other end of which is connected to said last-named orifice, and a second cock, one side only of which is connected into the second duct.

4. An apparatus of the class described comprising a hollow cylinder adapted to contain the substance to be injected and mounted so that its axis is substantially vertical, one end of said cylinder being conically shaped and having an orifice at the apex thereof, a conically shaped plunger head adapted to fit into said conically shaped end of said cylinder, a plunger body attached to said plunger head, a U-shaped packing disposed between said plunger head and said plunger body, said plunger head and said plunger body being slidably mounted inside of said cylinder, means for measuring the volume of the substance to be injected in said cylinder between said conically shaped end thereof and said plunger head, a shaft, one end of which is connected to said plunger body, a piston attached to the other end of said shaft, the cross-sectional area of said piston being larger than the cross-sectional area of said plunger body, a U-shaped packing attached to said piston, a second hollow cylinder in which said piston is slidably mounted, an orifice in said second cylinder, a source of compressed air, means connecting said source to said last-named orifice, said last-named orifice being positioned in said second cylinder so that compressed air from said source through said connecting means drives said piston, said shaft and said plunger body and plunger head whereby the substance in said first cylinder is expelled through said orifice therein, a microswitch positioned alongside said shaft, and means for closing said microswitch when said shaft is driven as aforesaid.

5. An apparatus as claimed in claim 4 wherein the cross-sectional area of said piston is four times the cross-sectional area of said plunger body.

6. An apparatus as claimed in claim 4 wherein said source of compressed air comprises a first tank containing compressed air at a low pressure and having a valve therein for opening and closing same, and a second tank containing compressed air at a high pressure having a valve therein for opening and closing same.

7. An apparatus as claimed in claim 6 wherein the pressure of the compressed air in said first tank is not more than 7 kg. per sq. cm. (100 lbs. per sq. in.) and the pressure of the air in said second tank is not more than 106 kg. per sq. cm. (1500 lbs. per sq. in.).

8. An apparatus as claimed in claim 6 wherein said connecting means comprises a regulator connected to the outlet side of said valve on said first tank, two low-pressure gauges connected to said regulator, a cock connected to the outlet side of said valve on said second tank, a high-pressure gauge disposed between said last-named valve and said cock, a duct connected at one end to the outlet of said regulator and at the other end between said last-named valve and said cock, a second duct connected at one end to the outlet of said cock and at the other end to said orifice in said second cylinder, and a second cock, one side only of which is connected into said second duct.

References Cited in the file of this patent

UNITED STATES PATENTS 2,547,099    Smoot ------------------ Apr. 3, 1951

FOREIGN PATENTS 1,044,346    France ------------------ June 17, 1953
1,074,773    France ------------------ Apr. 7, 1954